(12) United States Patent
Killen

(10) Patent No.: US 12,286,051 B1
(45) Date of Patent: Apr. 29, 2025

(54) SYSTEM, APPARATUS, AND METHOD FOR MOBILE TRAINING AND TESTING

(71) Applicant: Matthew Killen, Louisa, VA (US)

(72) Inventor: Matthew Killen, Louisa, VA (US)

(*) Notice: Subject to any disclaimer, the term of this patent is extended or adjusted under 35 U.S.C. 154(b) by 0 days.

(21) Appl. No.: 18/990,365

(22) Filed: Dec. 20, 2024

(51) Int. Cl.
*G09B 19/24* (2006.01)
*B60P 3/32* (2006.01)
*G09B 25/04* (2006.01)

(52) U.S. Cl.
CPC ............ *B60P 3/32* (2013.01); *G09B 25/04* (2013.01)

(58) Field of Classification Search
CPC ......... G09B 19/00; G09B 19/24; G09B 25/04
USPC .................................................. 434/219, 226
See application file for complete search history.

(56) References Cited

U.S. PATENT DOCUMENTS

| | | | |
|---|---|---|---|
| 4,337,048 A | 6/1982 | Hatch | |
| 4,526,548 A | 7/1985 | Livingston | |
| 5,679,003 A | 10/1997 | Schwechel | |
| 7,008,230 B2* | 3/2006 | Hoglund | G09B 19/00 434/236 |
| 7,244,123 B1* | 7/2007 | Barron | G09B 9/00 434/366 |
| 7,901,212 B2* | 3/2011 | Quinn | A62C 99/0081 434/226 |
| 8,360,782 B1* | 1/2013 | Temple | G09B 19/00 434/226 |
| 8,435,039 B2* | 5/2013 | Paganini | G09B 19/24 434/226 |
| 8,585,410 B2 | 11/2013 | Nielsen | |
| 8,622,744 B2 | 1/2014 | Lumry | |
| 9,424,758 B2* | 8/2016 | Davis | G09B 19/00 |
| 9,886,876 B2* | 2/2018 | Pierce | G09B 19/00 |
| 11,147,996 B2* | 10/2021 | Harding | B60G 17/017 |
| 11,524,195 B2* | 12/2022 | Bloemker | G09B 25/04 |
| 11,844,974 B2* | 12/2023 | Temple | G09B 9/00 |
| 11,915,604 B2 | 2/2024 | Drew | |
| 12,057,029 B2 | 8/2024 | Groves | |

FOREIGN PATENT DOCUMENTS

WO 2014177880 A2 11/2014

* cited by examiner

Primary Examiner — Kurt Fernstrom
(74) Attorney, Agent, or Firm — Keefe IP Law, PLLC

(57) ABSTRACT

A vehicle configured to move from a first geographic location to a second geographic location for at least one of building training or testing at each of the first and second geographic locations is disclosed. The vehicle has a plurality of rooms including an attic, an attic space disposed in the attic, attic framing disposed in the attic, the attic framing separating the attic space from an empty space, and at least one structural assembly disposed in the attic space and that simulates an attic error to be found during the at least one of building training or testing. The attic framing is disposed at an angle.

15 Claims, 7 Drawing Sheets

SYSTEM, APPARATUS, AND METHOD FOR MOBILE TRAINING AND TESTING

TECHNICAL FIELD

The present disclosure generally relates to a system, apparatus, and method for training and testing, and more particularly to a system, apparatus, and method for mobile training and testing.

BACKGROUND

Training for building weatherization and building science typically involves most or substantially all aspects of building features and mechanical systems. For example, training and testing related to building energy efficiency and building operation involves training and testing regarding building HVAC systems, building appliances, and building mechanical units.

Because most or substantially all aspects of actual building features and actual mechanical systems are involved with training and testing, conventional systems utilize actual buildings for training. This is because training and testing involves actual functioning building mechanical systems.

Accordingly, personnel to be trained typically travel to training buildings in order to participate in training. In doing so, personnel to be trained spend time traveling to and from training geographic locations. In cases for example involving rural areas, personnel to be trained may travel significant distances to attend training at a nearest training facility offering training and testing for most or substantially all aspects of building features and mechanical systems. Significant cost for travel and overnight stays such as at hotels may be involved in providing training to personnel in order to have those personnel be able to be located at training sites during building science instruction.

Accordingly, a need in the art exists for building weatherization and building science training to be more easily available and accessible to personnel to be trained.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to a vehicle configured to move from a first geographic location to a second geographic location for at least one of building training or testing at each of the first and second geographic locations. The vehicle includes a plurality of rooms including an attic, an attic space disposed in the attic, attic framing disposed in the attic, the attic framing separating the attic space from an empty space, and at least one structural assembly disposed in the attic space and that simulates an attic error to be found during the at least one of building training or testing. The attic framing is disposed at an angle.

In another aspect, the present disclosure is directed to a method. The method includes moving a vehicle from a first geographic location to a second geographic location, the vehicle having a plurality of rooms including an attic and a CAZ (combustion appliance zone) room, performing at least one of building training or testing including using at least one structural assembly disposed in the attic and that simulates an attic error to be found during the at least one of building training or testing, performing the at least one of building training or testing including using at least one working combustion appliance that is disposed in the CAZ room and that is vented by a duct to an outside of the vehicle, and performing the at least one of building training or testing at each of the first and second geographic locations. The attic is disposed at a same height relative to the vehicle as the CAZ room.

DETAILED DESCRIPTION AND INDUSTRIAL APPLICABILITY

The exemplary disclosed system, apparatus, and method may provide for mobile training and/or testing of building performance, weatherization, and/or building science. For example, the exemplary disclosed system, apparatus, and method may provide for mobile BPI training and/or testing (Building Performance Institute training and/or testing). The exemplary disclosed system, apparatus, and method may provide for BPI field examination.

Figure 1:
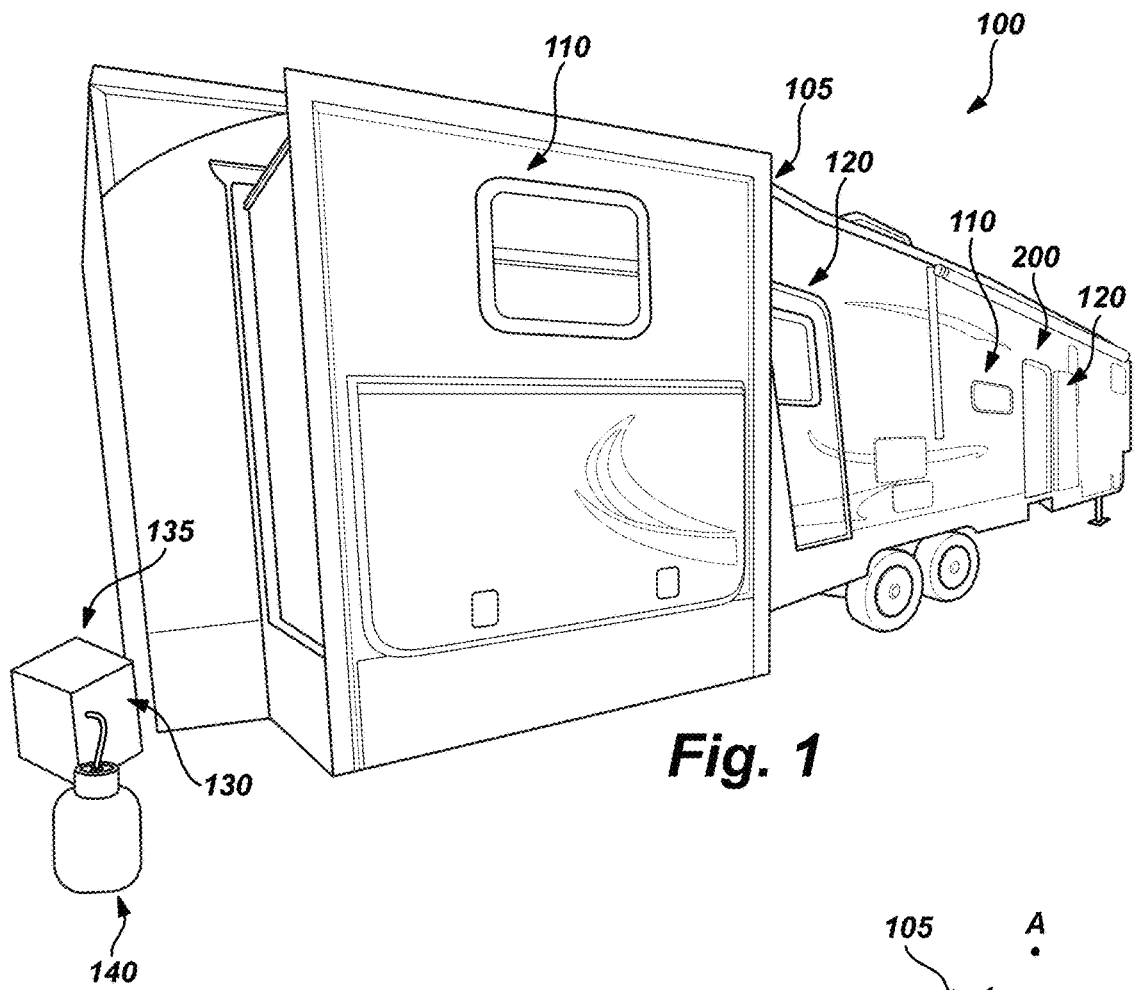
FIG. 1 is a perspective view of an exemplary embodiment of the present invention.

As illustrated in FIG. 1, the exemplary disclosed system, apparatus, and method may include providing a mobile training/testing system 100 including a mobile training/testing unit 105. As further described below, mobile training/testing system 100 may include a blower system 200, a kitchen training/testing system 300, a bathroom ventilation training/testing system 400, an HVAC training/testing system 500, a CAZ training/testing system 600, and an attic training/testing system 700, each of which may be housed in or on mobile training/testing unit 105 (e.g., in a plurality of rooms of mobile training/testing unit 105). Substantially all BPI training and/or testing may be performed using mobile training/testing unit 105 including blower system 200, kitchen training/testing system 300, bathroom ventilation training/testing system 400, HVAC training/testing system 500, CAZ training/testing system 600, and attic training/testing system 700.

Mobile training/testing unit 105 may be any suitable vehicle or mobile unit for housing blower system 200, kitchen training/testing system 300, bathroom ventilation training/testing system 400, HVAC training/testing system 500, CAZ training/testing system 600, and attic training/testing system 700. Mobile training/testing unit 105 may be a vehicle with or without mobile power for moving mobile training/testing system 100 between geographic locations. For example, mobile training/testing unit 105 may be an RV (recreational vehicle), an enclosed mobile trailer, or any other suitable mobile unit for housing the exemplary disclosed systems of mobile training/testing system 100. In at least some exemplary embodiments, mobile training/testing unit 105 may be a $5^{th}$ wheel RV that may be attached to a flatbed of a truck. Mobile training/testing unit 105 may thereby move under its own power or be towed or moved by another vehicle between different building training and/or testing geographic locations. Mobile training/testing unit 105 may be an RV having a drivetrain powered by any suitable power source such as a combustion engine, and may include AC and/or DC electrical systems.

Mobile training/testing unit 105 may serve as a structural support and housing for blower system 200, kitchen training/testing system 300, bathroom ventilation training/testing system 400, HVAC training/testing system 500, CAZ training/testing system 600, and attic training/testing system 700. Mobile training/testing unit 105 may include a structural frame and/or structural components that may be formed from any suitable structural members such as, for example, pipes, tubes, flanged members, channels, I-beams, rods, and/or any other suitable structural members. The exemplary disclosed structural members may be formed from structural plastic, metal, composite material, wood, fabric, ceramic, and/or any other suitable structural material. Mobile training/testing unit 105 may also include nonstructural components such as walls, siding, window treatments, and/or any other suitable nonstructural members. The exemplary disclosed structural members and/or nonstructural components may be formed from thermoplastic materials such as polyvinyl chloride (PVC) material, acrylonitrile butadiene styrene (ABS) material, polycarbonate material, PPS material, Polypropylene, HDPE, and/or any other suitable plastic material. The exemplary disclosed nonstructural components may be formed from plastic, textile, fabric, wood, metal, and/or any other suitable materials (e.g., including materials similar to the exemplary disclosed structural materials described above). The exemplary disclosed structural and/or nonstructural members may be attached together via mechanical connectors such as clamps, screws, bolts, pins, and/or any other suitable fasteners for fastening, snap-fit connection, press-fit connection, adhesive, hook and loop fasteners, magnetic fasteners, mechanical fasteners, and/or any other suitable attachment technique. The exemplary disclosed components of blower system 200, kitchen training/testing system 300, bathroom ventilation training/testing system 400, HVAC training/testing system 500, CAZ training/testing system 600, and attic training/testing system 700 may be formed from similar materials described above regarding mobile training/testing unit 105 and fastened similarly to as described above.

Figure 2:
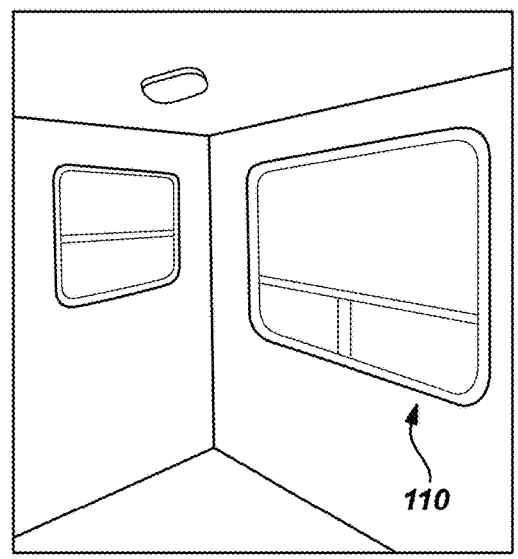
FIG. 2 is another perspective view of an exemplary embodiment of the present invention.

As illustrated in FIGS. 1 and 2, mobile training/testing unit 105 may include at least one exterior window 110 and at least one exterior door 120. For example, mobile training/testing unit 105 may include a plurality of exterior windows 110 and two exterior doors 120. In at least some exemplary embodiments, mobile training/testing unit 105 may be an RV or enclosed trailer including relatively high ceilings (e.g., between about 8 feet and about 14 feet) and/or slide-outs (e.g., motorized cable slide-outs). Exterior windows 110 and exterior doors 120 may be operable so that components may be identified and opened and closed during building training and/or testing.

Figure 1A:
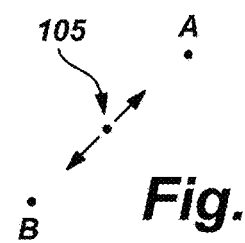
FIG. 1A is a schematic view of an exemplary embodiment of the present invention.

As illustrated in FIG. 1, mobile training/testing system 100 may include one or more power assemblies 130 that may be connected to and power mobile training/testing unit 105. For example, two power assemblies 130 may be provided, one on each side of mobile training/testing unit 105. Power assembly 130 may include a power generator 135 and a fuel supply 140. Power generator 135 may operate using propane or natural gas supplied by fuel supply 140 that may be a gas vessel. Fuel supply 140 may also directly supply exemplary disclosed gas-burning components of kitchen training/testing system 300 and/or CAZ training/testing system 600 for example as described below. In at least some exemplary embodiments, power assembly 130 may include electrical connectors (e.g., a 50 amp RV cord), cable and/or internet connectors, and/or gas connectors that can be directly connected to respective utility hookups such as electrical power sources (e.g., electrical outlets), cable and/or internet connectors, and/or gas connectors at a given geographic location. For example as illustrated in FIG. 1A, mobile training/testing unit 105 may move between any desired number of training/testing geographic locations (e.g., a first geographic location A and a second geographic location B), some or substantially all of which may have the exemplary disclosed utilities and/or hookups (e.g., or mobile training/testing unit 105 may be self-contained and operate at geographic locations without utilities and/or hookups). The exemplary disclosed geographic locations may be disposed at any desired distance from each other (e.g., less than a mile, or up to hundreds of miles or thousands of miles away from each other). Mobile training/testing unit 105 may also include television mounts (e.g., wall-mounts) and satellite connections for providing training videos and presentations. Mobile training/testing system 100 may also include water connectors and/or sewer connectors that may be similarly connected to respective water and/or sewer utility hookups at a given geographic location. Also for example, water connectors may be connected to one or more water reservoirs (e.g., water tanks) included on mobile training/testing unit 105. Mobile training/testing unit 105 may thereby be provided with electrical power, cable, internet, propane or natural gas, water, and/or waste removal at a given geographic location such as at a desired training and testing geographic location (e.g., geographic locations A or B).

As further described below, mobile training/testing unit 105 may include a plurality of rooms such as bathrooms, kitchen, bedrooms, living rooms, a mechanical room such as a CAZ room, an attic, and any other suitable rooms that may be utilized in the exemplary disclosed training and/or testing. Mobile training/testing unit 105 may thereby be used for training and testing of BPI, weatherization, and/or building science associated with permanent buildings as described herein, while still providing a mobile unit that can be moved to geographic locations convenient for personnel to be trained.

Figure 3A:
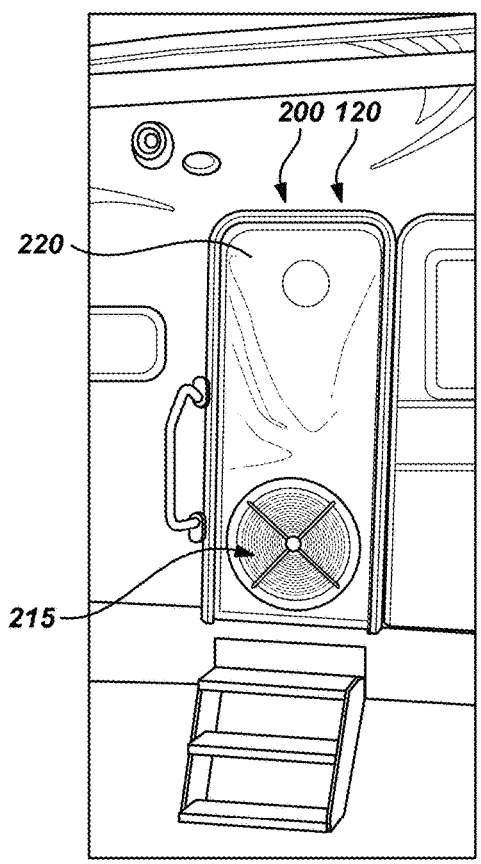
FIG. 3A is another perspective view of an exemplary embodiment of the present invention.
Figure 3B:
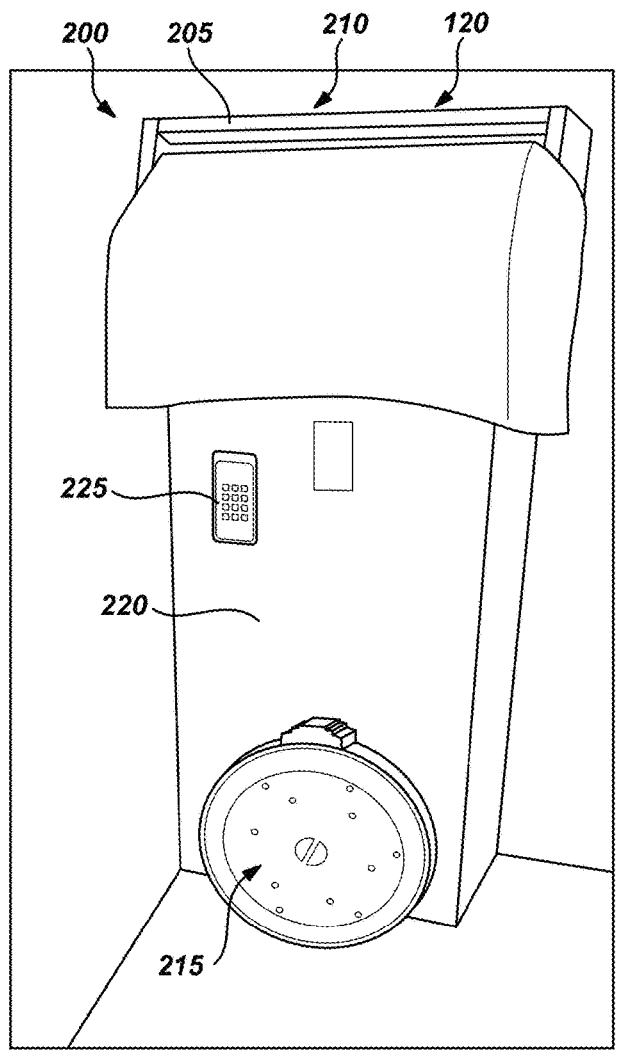
FIG. 3B is another perspective view of an exemplary embodiment of the present invention.

As illustrated in FIGS. 3A and 3B, mobile training/testing unit 105 may include blower system 200 that may be disposed at one or more exterior doors 120. Blower system 200 may include a framing assembly 205. Framing assembly 205 may include a plurality of wood members (e.g., and/or composite, plastic, and/or metal members) that may be fastened to each other (e.g., via mechanical fasteners such as screws and/or bolts or the exemplary disclosed fasteners described above) and to a door frame 210 of exterior door 120 to strengthen door frame 210. Framing assembly 205 may be a strengthening frame that may strengthen door frame 210. Framing assembly 205 may thereby effectively transfer forces from an operation of the exemplary disclosed blower of blower system 200 to walls and/or a structural frame of mobile training/testing unit 105 without damage being caused to exterior door 120. For example, without framing assembly 205, mobile training/testing units 105 such as RVs or trailers may not be able to effectively support blower system 200 while it is operating and exerting forces. Framing assembly 205 may facilitate blower door set-up and support, measurement, and diagnostics by providing for attachment of the exemplary disclosed blower door components.

Blower system 200 may be a blower door assembly configured to be removably attachable to framing assembly 205. Blower system 200 may include a blower 215 (e.g., a fan or any other suitable type of blower). Blower 215 may be a variable-speed fan. Blower 215 may be any suitable device for causing a pressure change in an interior of mobile training/testing unit 105 such as, for example, a fan (e.g., a box fan), a Duct Blaster® fan, or any other suitable type of blower for assessing airtightness and identifying leaks. Blower system 200 may also include a panel 220 that may fit into framing assembly 205 to seal (e.g., substantially seal) an opening of exterior door 120. Panel 220 may be formed from nylon material and/or any other suitable material for sealing an opening of exterior door 120. Blower system 200 may also include a pressure gauge 225 for measuring pressure differences and a manometer for measuring airflow that may be connected to and may communicate with pressure gauge 225. Blower system 200 may be utilized in BPI testing (e.g., to perform a blower door test). For example, blower system 200 may operate to perform a blower door test in which blower 215 may pull air out of an interior of mobile training/testing unit 105, which may help detect air leakage of components of mobile training/testing unit 105. For example, blower system 200 may be used to perform zone pressure diagnostics (ZPD) testing to measure pressure differences between spaces in mobile training/testing unit 105 to determine air leakage and prioritize air-sealing efforts. Blower system 200 may also be used to perform room-to-room pressure testing of mobile training/testing unit 105 to measure a difference in air pressure between two adjacent rooms (e.g., testing done to assess the airflow dynamics within a building).

Figure 4:
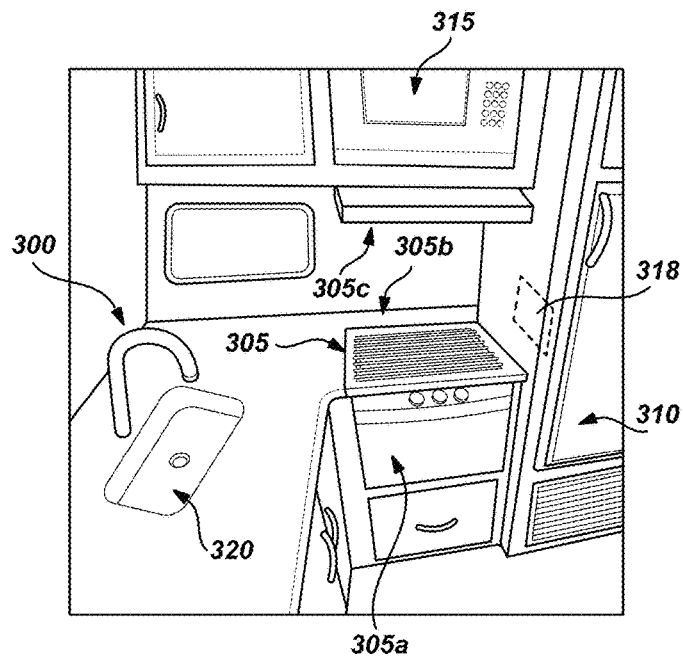
FIG. 4 is another perspective view of an exemplary embodiment of the present invention.

As illustrated in FIG. 4, mobile training/testing unit 105 may include kitchen training/testing system 300. Kitchen training/testing system 300 may include working electrical and gas appliances that may be used for the exemplary disclosed training and testing. Kitchen training/testing system 300 may include a range 305, a refrigerator 310, a microwave 315, and a water device 320 that may be used in the exemplary disclosed training and testing. Kitchen training/testing system 300 may include any other suitable appliances such as an electrically powered dishwasher and/or dehumidifier, and/or any other appliances used for the exemplary disclosed training and testing.

Range 305 may be a range or stove including a working oven 305a, a working stovetop 305b, and a working range hood 305c. Oven 305a and/or stovetop 305b may be working gas devices (e.g., natural gas or propane) supplied via gas lines running through wall spaces of mobile training/testing unit 105 and connected to power assembly 130. Oven 305a and/or stovetop 305b may alternatively be working electrical devices electrically connected to power assembly 130. Range hood 305c may be an electrical device connected to power assembly 130. BPI training and testing (e.g., combustion science testing) for CO and/or contaminants may be performed using oven 305a and/or stovetop 305b. For example, combustion safety training and testing may be performed using range 305. Range hood 305c may be a working hood that may be checked (e.g., tested) for CFM (cubic feet per minute) fan flow.

Refrigerator 310 and microwave 315 may be working electrical devices that may be electrically connected to power assembly 130. BPI training and testing (e.g., field testing) may be performed using refrigerator 310 and microwave 315. Refrigerator 310 may include a data plate 318 disposed in an interior of refrigerator 310. Data plate 318 may be a manufacturer data plate including manufacturer's information associated with refrigerator 310 that may be used in the exemplary disclosed training and testing.

Water device 320 may be a working sink that may be connected via water supply lines of mobile training/testing unit 105 to power assembly 130 (e.g., to the exemplary disclosed water utility hookups) and/or water reservoirs of mobile training/testing unit 105 (e.g., including the exemplary disclosed water heater described herein). Water flow of water device 320 may be tested for example to check flow in GPM (gallons per minute). Other water devices similar to water device 320 may be included and tested such as, for example, sinks and/or showers of bathrooms included in mobile training/testing unit 105.

Figure 5:
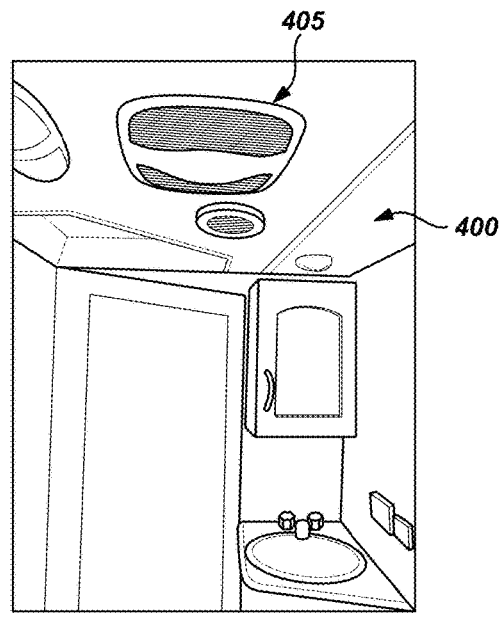
FIG. 5 is another perspective view of an exemplary embodiment of the present invention.

As illustrated in FIG. 5, mobile training/testing unit 105 may include bathroom ventilation training/testing system 400. Bathroom ventilation training/testing system 400 may include a bathroom vent 405. Bathroom vent 405 may be a working electrical device that may be electrically connected to power assembly 130. Bathroom vent 405 may be any suitable bathroom exhaust fan such as a fan that may be ceiling-mounted or wall-mounted. Bathroom vent 405 may be vented to the outside of mobile training/testing unit 105 to push indoor air out of mobile training/testing unit 105. For example, bathroom fan 405 may be directly vented through a wall or ceiling (e.g., via a duct) out of mobile training/testing unit 105. Bathroom fan 405 may be a working bathroom exhaust fan that may be checked (e.g., tested) for CFM (cubic feet per minute) fan flow.

Figure 8:
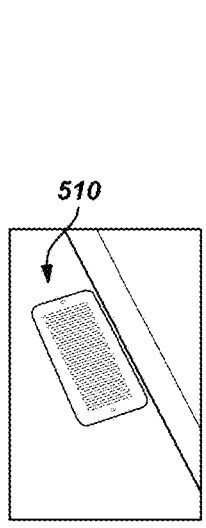
FIG. 8 is another perspective view of an exemplary embodiment of the present invention.
Figure 6:
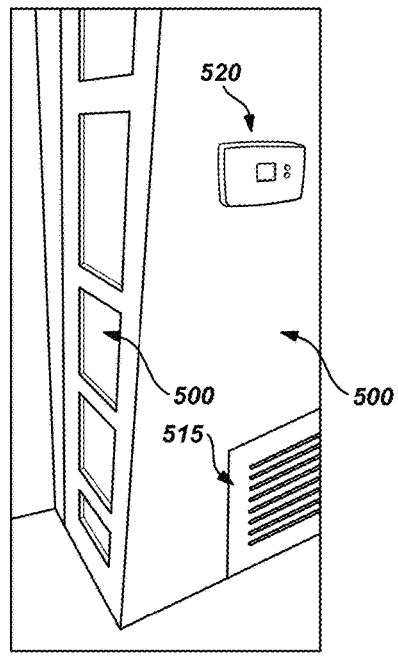
FIG. 6 is another perspective view of an exemplary embodiment of the present invention.
Figure 7:
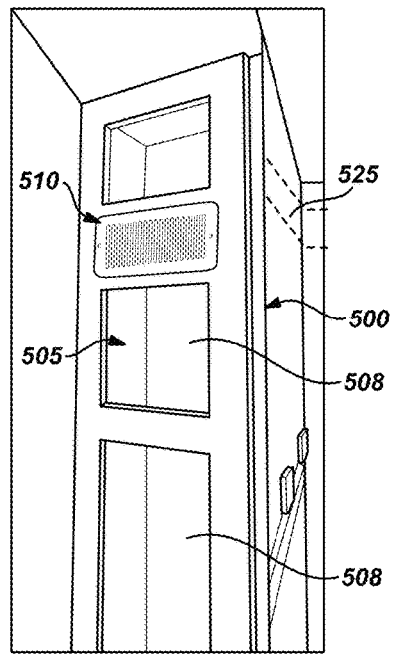
FIG. 7 is another perspective view of an exemplary embodiment of the present invention.

As illustrated in FIGS. 6-8, mobile training/testing unit 105 may include HVAC training/testing system 500. HVAC training/testing system 500 may include an HVAC supply chase 505, one or more supply vents 510, one or more return vents 515, a thermostat 520, and a ducted distribution system including ductwork 525 that may be incorporated into a central heating and/or air conditioning system of mobile training/testing unit 105.

Supply chase 505 may have one or more supply vents 510, and/or may be connected to supply vents 510 located in floors and other suitable locations of mobile training/testing unit 105 via ductwork 525 of the ducted distribution system of mobile training/testing unit 105 (e.g., that may be disposed in wall spaces and ceiling spaces of mobile training/testing unit 105). Supply chase 505 may have transparent walls 508 through which users may see portions of ductwork 525, which may facilitate duct testing and other exemplary disclosed training and testing. Supply chase 505 may thereby be fluidly connected to supply vents 510 for providing heated or cooled air to interior spaces of mobile training/testing unit 105. Supply chase 505 may be fluidly connected via ductwork 525 to the exemplary disclosed furnace (e.g., and air conditioning devices) of mobile training/testing unit 105. One or more return vents 515 may also be fluidly connected to the ducted distribution system of mobile training/testing unit 105, and may return air from interior spaces of mobile training/testing unit 105 to the central heating and/or air conditioning system of mobile training/testing unit 105. Thermostat 520 may be a working electrical device that may be electrically connected to power assembly 130. Thermostat 520 may be used to control the exemplary disclosed furnace of CAZ training/testing system 600.

Also for example, mobile training/testing unit 105 may include ductwork 525 (e.g., part of the central heating and/or air conditioning system) that may distribute air throughout mobile training/testing unit 105. Ductwork 525 may be working ductwork that effectively transfers air throughout mobile training/testing unit 105. Ductwork 525 may be used in the exemplary disclosed training and/or testing including, for example, pressure pan testing, duct blaster testing (e.g., testing using a duct blaster to directly pressure test the duct system for air leaks), zone pressure testing, room to room pressure testing, and/or any other suitable testing (e.g., exemplary disclosed testing such as BPI testing).

Figure 10:
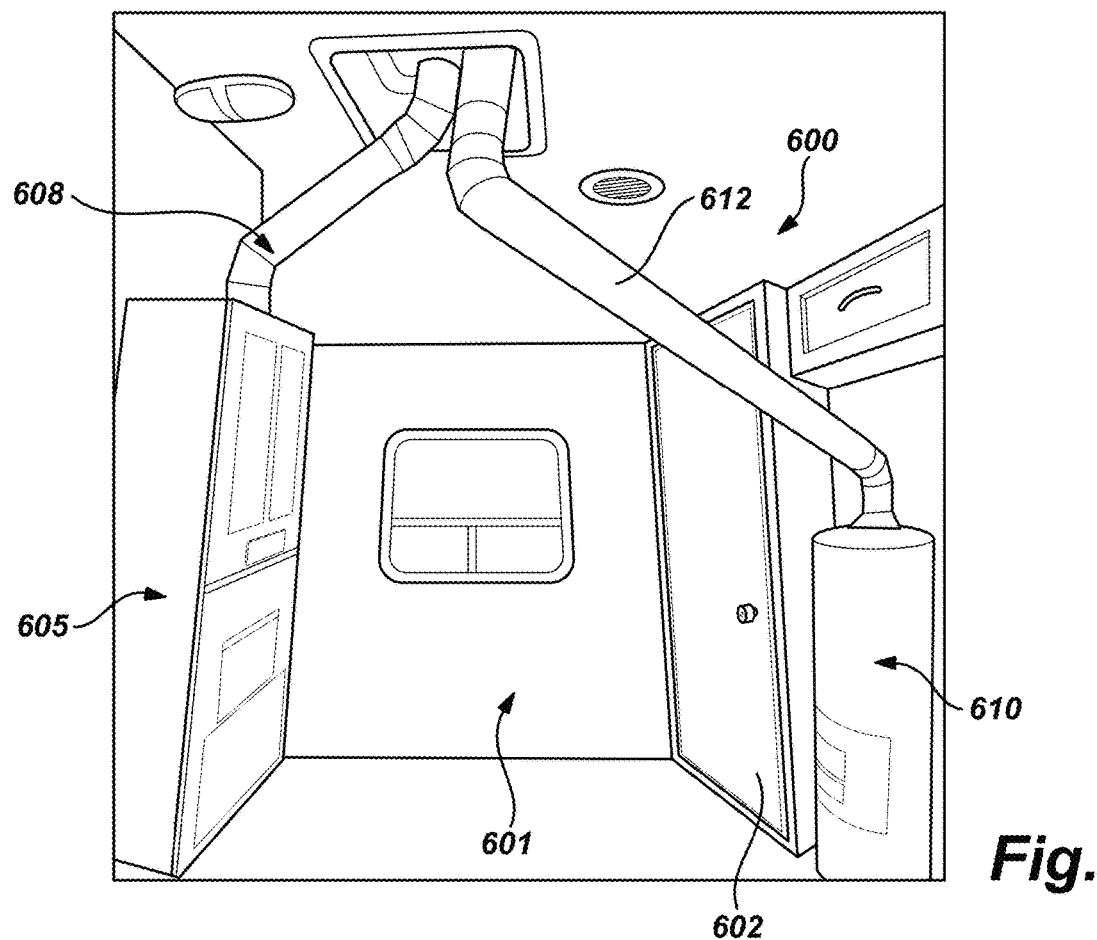
FIG. 10 is another perspective view of an exemplary embodiment of the present invention.
Figure 9:
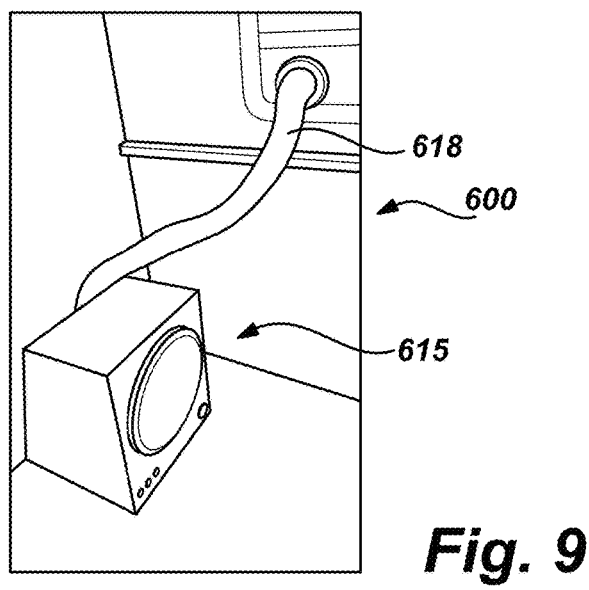
FIG. 9 is another perspective view of an exemplary embodiment of the present invention.

As illustrated in FIGS. 9 and 10, mobile training/testing unit 105 may include CAZ training/testing system 600 that may be disposed in a CAZ room 601 that may be a combustion appliance zone (CAZ). CAZ training/testing system 600 may include a furnace 605, a water heater 610, a dryer 615, and/or any other suitable combustion appliances. CAZ training/testing system 600 may be disposed in CAZ room 601 that may be a separate room from other rooms of mobile training/testing unit 105. For example, CAZ training/testing system 600 may be disposed in CAZ room 601 that may be a dedicated room for some or all combustion appliances of mobile training/testing unit 105. In at least some exemplary embodiments, a CAZ door 602 may separate CAZ room 601 of CAZ training/testing system 600 from the rest of mobile training/testing unit 105. For example, CAZ door 602 may be a laundry room or mechanical room door separating CAZ room 601 that may be a laundry room or mechanical room (e.g., simulated, working laundry room or mechanical room for training and testing) from the rest of mobile training/testing unit 105 (e.g., simulated house with working components).

Furnace 605 may be a fossil fuel burning appliance used for space heating. Furnace 605 may be a gas furnace. Furnace 605 may be a natural gas, propane, oil, ethanol, or any other suitable type of fossil fuel burning furnace. Furnace 605 may be a working gas furnace such as a furnace for burning natural gas or propane supplied by power assembly 130 via gas supply lines disposed in mobile training/testing unit 105 (e.g., in wall spaces of mobile training/testing unit 105). Furnace 605 may be a residential furnace. Furnace 605 may be a forced air furnace. Furnace 605 may be used for building training and/or testing for CO, efficiency, temperature rise, and/or any other suitable exemplary disclosed building training and/or testing described herein.

Furnace 605 may be vented to an outside of mobile training/testing unit 105. For example, furnace 605 may be vented via a furnace duct 608. Furnace duct 608 may be any suitable passage for transferring exhaust gases such as, for example, sheet metal ducts (e.g., aluminum or galvanized steel ducts). In at least some exemplary embodiments, furnace duct 608 may be a rigid metal duct. Exhaust gas from burning of fossil fuel of furnace 605 may be vented up and outside of mobile training/testing unit 105 via furnace duct 608.

Water heater 610 may be a working fossil fuel burning appliance used for water heating. Water heater 610 may operate using similar fossil fuel as described above regarding furnace 605. For example, water heater 610 may be a hot water source for a gas domestic hot water system (DHW) of mobile training/testing unit 105. Water heater 610 may be a natural gas or propane water heater. Water heater 610 may be a storage tank water heater (e.g., a gas storage tank water heater). Water heater 610 may be used for building training and/or testing for CO, efficiency, draft and spillage, and/or any other suitable exemplary disclosed building training and/or testing described herein.

Water heater 610 may be vented to an outside of mobile training/testing unit 105. For example, water heater 610 may be vented via a water heater duct 612 that may be generally similar to furnace duct 608. In at least some exemplary embodiments, water heater duct 612 may be a rigid metal duct. Exhaust gas from burning of fossil fuel of water heater 610 may be vented up and outside of mobile training/testing unit 105 via water heater duct 612. In at least some exemplary embodiments, water heater duct 612 may provide for natural draft venting of exhaust gases from water heater 610 (e.g., and/or furnace duct 608 may provide for natural draft venting of exhaust gases from furnace 605). Furnace 605 and water heater 610 may be working appliances that may be used together for some building training and/or testing (e.g., for some combustion appliance testing).

Dryer 615 may be an electric appliance or a gas appliance (e.g., electric and/or gas appliance). For example, dryer 615 may be an electric dryer. Dryer 615 may be a working electric or fossil fuel burning appliance used for drying clothes, linens, and/or other similar articles. Dryer 615 may be a gas dryer. Dryer 615 may operate using similar fossil fuel as described above regarding furnace 605. Dryer 615 may be a natural gas or propane dryer. Dryer 615 may be a vented clothes dryer. For example, dryer 615 may be vented via a dryer duct 618 that may be generally similar to furnace duct 608. In at least some exemplary embodiments, dryer duct 618 may be a flexible metal duct. Exhaust gas from an operation of dryer 615 may be vented outside of mobile training/testing unit 105 via dryer duct 612 (e.g., via a window such as one of the exterior windows 110 of mobile training/testing unit 105).

In at least some exemplary embodiments, the exemplary disclosed combustion appliances of CAZ training/testing system 600 may be working, vented combustion appliances (e.g., vented to an outside of mobile training/testing unit 105) that may be mobile and moved to desired geographic locations for building training and/or testing based on being disposed on mobile training/testing unit 105. Mobile working combustion equipment that is vented may thereby be moved to desired geographic locations for building training and/or testing such as, for example, spillage checking, tracking for draft, CO level checking, efficiency checking, temperature rise checking, and/or any other suitable combustion safety testing and/or exemplary disclosed building training and/or testing (e.g., BPI testing).

Figure 11:
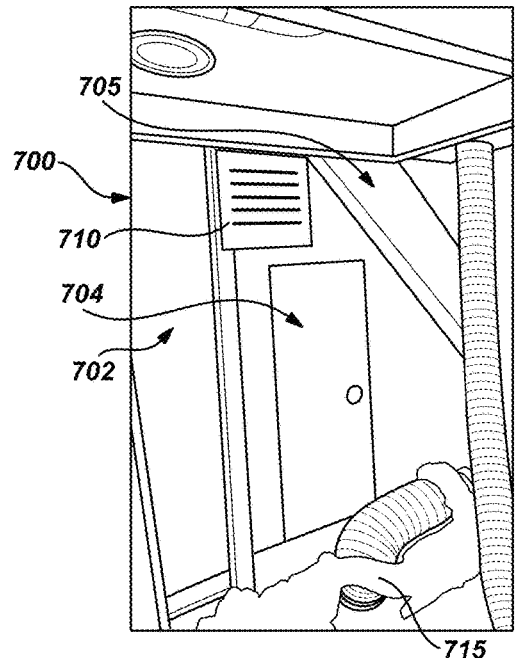
FIG. 11 is another perspective view of an exemplary embodiment of the present invention.

As illustrated in FIGS. 11 through 17, mobile training/testing unit 105 may include attic training/testing system 700. Attic training/testing system 700 may be disposed in an attic space 702. Attic space 702 may include exemplary disclosed components described below that may be found in an attic of a house. In at least some exemplary embodiments, an attic door 704 may separate attic space 702 from the rest of mobile training/testing unit 105. For example as illustrated in FIG. 11, attic door 704 may be an attic door separating room attic space 702 (e.g., simulated, working attic for training and testing) from the rest of mobile training/testing unit 105 (e.g., simulated house with working components). Attic space 702 may be a full walk-in attic with lights. The exemplary disclosed components of attic space 702 described below may be used in energy auditor training and/or testing of the exemplary disclosed building training and/or testing (e.g., BPI testing). Attic training/testing system 700 including attic space 702 may be disposed in an attic 701 as illustrated in FIG. 18. Attic 701 may be located at a same height relative to mobile training/testing unit 105 as other rooms as described below.

In at least some exemplary embodiments and as illustrated in FIG. 11, attic training/testing system 700 may include attic framing 705. For example, attic space 702 may be framed by structural members (e.g., wood members) of attic framing 705. Attic framing 705 may be angled (e.g., include angled members) that may be configured as a pitched roof, a gable, and/or other angled roof configurations. Attic framing 705 may provide an attic configuration including for example the appearance of gables and/or a pitched roof when viewed from the interior of attic space 702, though attic space 702 may actually be disposed in a rectangular prismatic section of mobile training/testing unit 105 (e.g., attic framing 705 may provide a different shape to attic space 702 than a rectangular prismatic shape of a section of mobile training/testing unit 105 in which attic space 702 is actually located). For example, although attic framing 705 may provide the appearance of gables and/or a pitched roof when viewed from the inside of attic space 702, an exterior of mobile training/testing unit 105 may retain a rectangular prismatic shape and may not be shaped with gables and/or a pitched roof (e.g., as illustrated in FIG. 1). For example as illustrated in FIG. 18, an empty space 703 may be disposed between attic framing 705 and an exterior of mobile training/testing unit 105 (e.g., attic framing 705 may provide a false wall or partition that separates attic space 702 from empty space 703 within attic 701). Empty space 703 may be disposed between attic framing 705 and an exterior wall 105a of mobile training/testing unit 105 as illustrated in FIG. 18. For example, attic framing 705 may be configured as an attic gable separating attic space 702 from empty space 703, and attic framing 705 may be disposed within a vehicle (e.g., mobile training/testing unit 105) and covered by exterior wall 105a of the vehicle (e.g., when viewed from the outside of the vehicle such as from an outside of mobile training/testing unit 105). Returning to FIG. 11, attic training/testing system 700 may also include venting such as one or more gable vents 710 (e.g., and/or any other suitable type of insulation such as soffit or ridge ventilation). Attic training/testing system 700 may further include insulation 715 such as fiberglass insulation, sprayed foam insulation, polyurethan-insulation, and/or any other suitable type of insulation.

Figure 12:
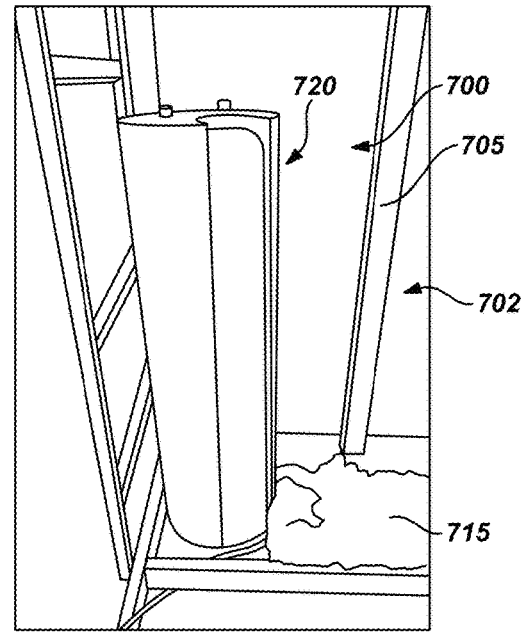
FIG. 12 is another perspective view of an exemplary embodiment of the present invention.

In at least some exemplary embodiments and as illustrated in FIG. 12, attic training/testing system 700 may include a training assembly 720. Training assembly 720 may be a cutout assembly for providing building training and/or testing on a given appliance to demonstrate parts of the appliance and how the appliance functions. For example, training assembly 720 may be a cutout of a gas water heater (e.g., or cutout of any other appliance of mobile training/testing unit 105). Training assembly 720 may also be disposed in any other suitable portion of mobile training/testing unit 105.

Figure 13:
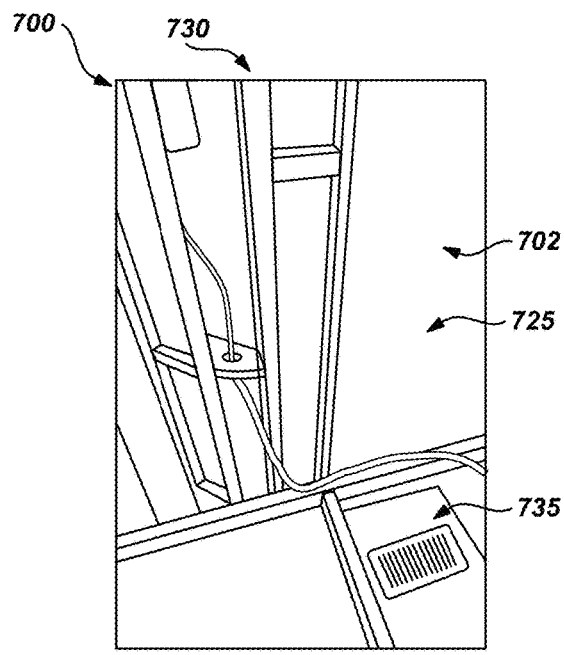
FIG. 13 is another perspective view of an exemplary embodiment of the present invention.

In at least some exemplary embodiments and as illustrated in FIG. 13, attic training/testing system 700 may include additional attic features and/or structural assemblies that simulate attic errors to be found during the exemplary disclosed building training and/or testing. For example, a knee wall assembly 725 may be configured as an uninsulated knee wall to be identified during the exemplary disclosed building training and/or testing. Also for example, a plumbing chase 730 may be configured as an unsealed plumbing chase to be identified during the exemplary disclosed building training and/or testing. Further for example, a vent 735 (e.g., vent and duct) connected to components of an HVAC system (e.g., similar to HVAC training/testing system 500) may be included in attic training/testing system 700, which may be used in the exemplary disclosed building training and/or testing.

Figure 14:
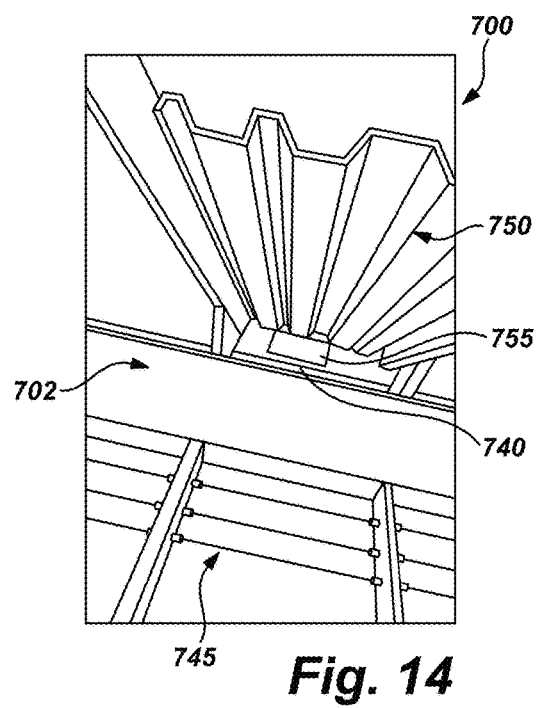
FIG. 14 is another perspective view of an exemplary embodiment of the present invention.

In at least some exemplary embodiments and as illustrated in FIG. 14, attic training/testing system 700 may include further attic features and/or structural assemblies that simulate attic errors to be found during the exemplary disclosed building training and/or testing. For example, a top plate assembly 740 may be configured as an open top plate to be identified during the exemplary disclosed building training and/or testing. Also for example, knob and tube wiring 745 may be disposed in attic space 702 (e.g., or in any other suitable location of mobile training/testing unit 105) to be identified during the exemplary disclosed building training and/or testing. Other features such as insulation baffles 750 and soffit vents 755 may be disposed in attic space 702 and used for the exemplary disclosed building training and/or testing.

Figure 15:
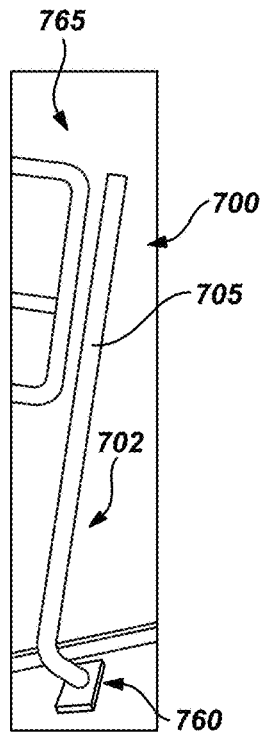
FIG. 15 is another perspective view of an exemplary embodiment of the present invention.

In at least some exemplary embodiments and as illustrated in FIG. 15, attic training/testing system 700 may include further attic features and/or structural assemblies that simulate attic errors to be found during the exemplary disclosed building training and/or testing. For example, a junction box 760 may be configured as an open junction box to be identified during the exemplary disclosed building training and/or testing. Also for example, a plumbing stack 765 may be configured as a plumbing stack that does not terminate (e.g., may not be connected to a vent and/or vented outside) to be identified during the exemplary disclosed building training and/or testing.

Figure 16B:
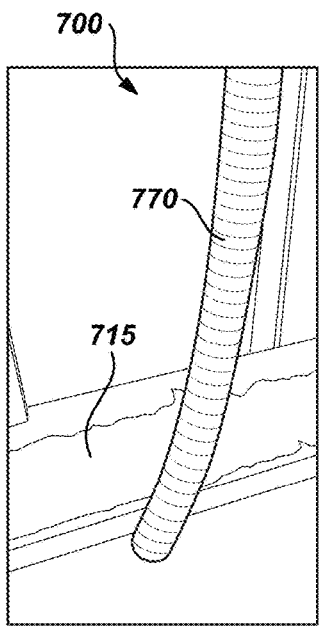
FIG. 16B is another perspective view of an exemplary embodiment of the present invention.
Figure 16A:
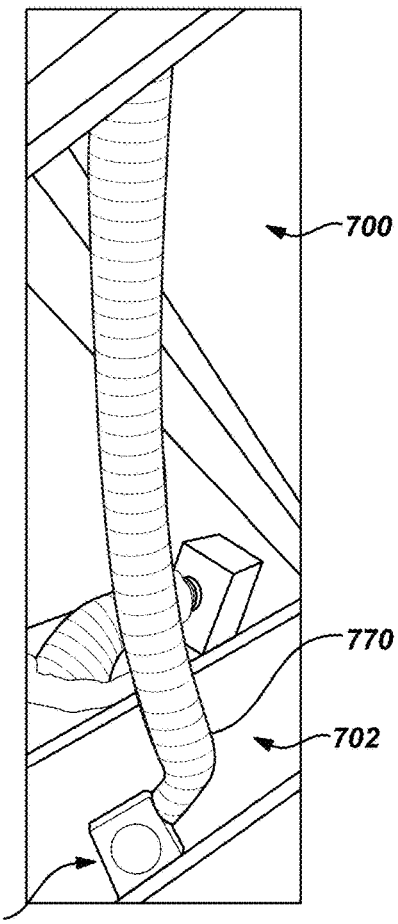
FIG. 16A is another perspective view of an exemplary embodiment of the present invention.

In at least some exemplary embodiments and as illustrated in FIGS. 16A and 16B, attic training/testing system 700 may include further attic features and/or structural assemblies that simulate attic errors to be found during the exemplary disclosed building training and/or testing. For example, a vent duct 770 may be configured as connected (e.g., fluidly connected to carry exhaust) to an attic fan 772 (e.g., that may be similar to a fan of bathroom vent 405) as illustrated in FIG. 16A or as disconnected from attic fan 772 as illustrated in FIG. 16B, and may be identified during the exemplary disclosed building training and/or testing. Vent duct 770 may be vented through a roof of attic space 702.

Figure 17:
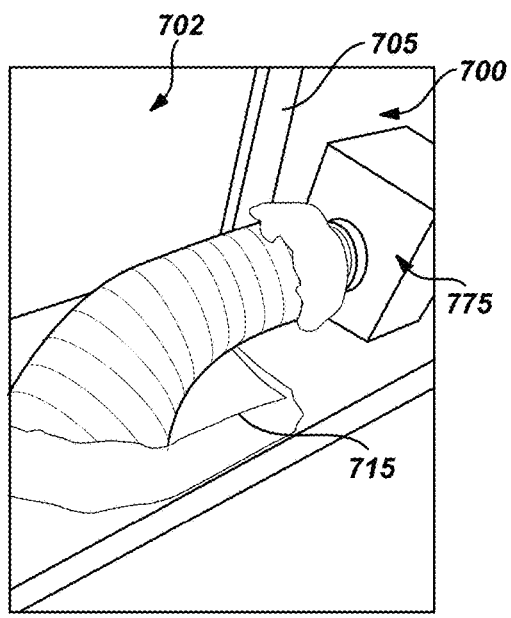
FIG. 17 is another perspective view of an exemplary embodiment of the present invention.
Figure 18:
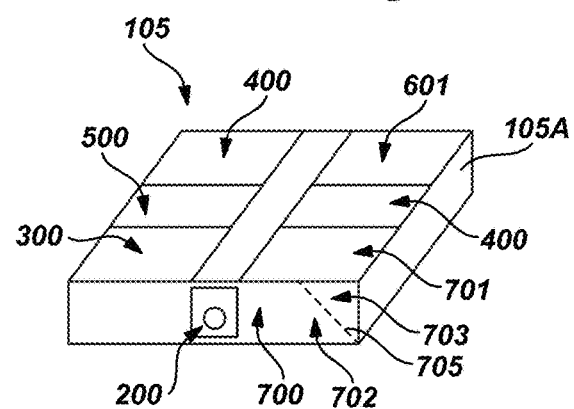
FIG. 18 is a schematic view of an exemplary embodiment of the present invention.

In at least some exemplary embodiments and as illustrated in FIG. 17, attic training/testing system 700 may include a supply plenum assembly 775 including ductwork (e.g., a portion of ductwork 525) that may be connected (e.g., fluidly connected to transfer heating and/or cooling air) to an HVAC system (e.g., similar to HVAC training/testing system 500). Supply plenum assembly 775 may be used for the exemplary disclosed building training and/or testing.

In at least some exemplary embodiments, the exemplary disclosed components of attic training/testing system 700 may include working and/or vented components that may be mobile and moved to geographic locations for building training and/or testing based on being disposed on mobile training/testing unit 105. The exemplary disclosed components of attic training/testing system 700 may thereby be moved to desired geographic locations for the exemplary disclosed building training and/or testing (e.g., building performance, weatherization, and/or building science training and/or testing including for example BPI testing). For example, attic training/testing system 700 may provide a mobile attic (e.g., configured as a house attic) that may be substantially fully functional (e.g., fully functional) and that may be moved to desired geographic locations to provide for the exemplary disclosed building training and/or testing. Attic space 702 may thereby be a functional, mobile attic.

In at least some exemplary embodiments and as illustrated in FIG. 18, blower system 200, kitchen training/testing system 300, bathroom ventilation training/testing system 400, HVAC training/testing system 500, CAZ training/testing system 600, and attic training/testing system 700 may be located in rooms at a same height relative to mobile training/testing unit 105 (e.g., on a same level or floor of mobile training/testing unit 105 as each other). For example, although attic space 702 may simulate an attic, attic space 702 may be a room located on the same level as other rooms (e.g., spaces, areas, or compartments) of mobile training/testing unit 105 (e.g., as opposed to be located above other rooms or spaces of mobile training/testing unit 105). Mobile training/testing system 100 may thereby provide a mobile testing/training house having multiple rooms and/or spaces (e.g., a CAZ, an attic, a blower system, and other exemplary disclosed systems) that may provide for the exemplary disclosed building training and/or testing systems. For example, mobile training/testing system 100 may provide a mobile attic and a mobile CAZ for building training and/or testing.

The exemplary disclosed system, apparatus, and method may be used in any suitable application for training and/or testing involving building weatherization and/or building science. For example, the exemplary disclosed system, apparatus, and method may be used for providing building weatherization and building science training and/or testing using functioning building features and systems. The exemplary disclosed system, apparatus, and method may be used for any mobile training and/or testing for building weatherization and/or building science.

Figure 19:
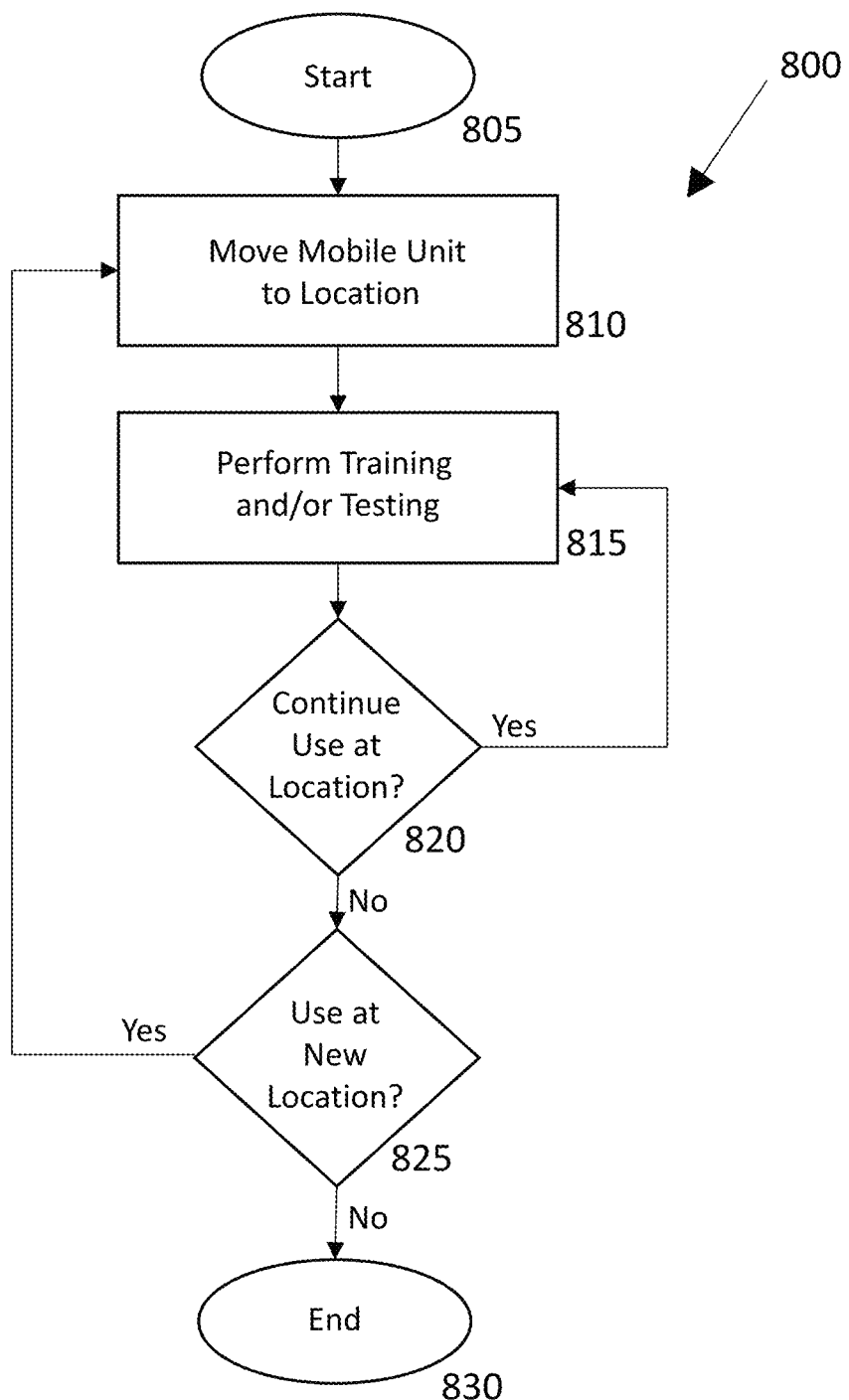
FIG. 19 illustrates an exemplary process of at least some exemplary embodiments of the present disclosure.

FIG. 19 illustrates an exemplary operation of mobile training/testing system 100. Process 800 begins at step 805. At step 810, mobile training/testing unit 105 may be moved to a geographic location such as a training/testing location. For example, mobile training/testing unit 105 that may be an RV may be driven to the geographic location. Mobile training/testing unit 105 that may be an enclosed mobile trailer may be towed to the geographic location. Personnel to be trained and/or tested may be located at or near that geographic location. For example, the geographic location may be a workplace of personnel to be trained and/or tested or a convenient geographic location for personnel to attend building training and/or testing. Personnel may thereby participate in building training and/or testing without undertaking extensive travel and/or overnight stays in areas remote from their usual workplace and/or home locations.

At step 815, mobile training/testing system 100 that has been moved to the training/testing geographic location by movement of mobile training/testing unit 105 may be used to perform the exemplary disclosed building training and/or testing. Mobile training/testing system 100 may be used for building performance, weatherization, and/or building science training and/or testing including for example BPI training and/or field examination. Blower system 200 may be configured at (e.g., set up at or attached to) framing assembly 205 for example as described above. The exemplary disclosed building training and/or testing described above regarding blower system 200 may then be performed. Blower system 200 may be detached from framing assembly 205 for example when building training and/or testing using blower system 200 is complete (e.g., if desired).

The exemplary disclosed building training and/or testing regarding kitchen training/testing system 300 described above may also be performed. For example, the exemplary disclosed building training and/or testing may be performed using range 305, refrigerator 310, microwave 315, and/or water device 320.

The exemplary disclosed building training and/or testing regarding bathroom ventilation training/testing system 400 described above may also be performed. For example, the exemplary disclosed building training and/or testing may be performed using bathroom vent 405.

The exemplary disclosed building training and/or testing regarding HVAC training/testing system 500 described above may also be performed. For example, the exemplary disclosed building training and/or testing may be performed using supply chase 505, one or more supply vents 510, one or more return vents 515, thermostat 520, and/or ductwork 525.

The exemplary disclosed building training and/or testing regarding CAZ training/testing system 600 described above may also be performed. For example, the exemplary disclosed building training and/or testing may be performed using furnace 605, water heater 610, and/or dryer 615.

The exemplary disclosed building training and/or testing regarding attic training/testing system 700 described above may also be performed. For example, the exemplary disclosed building training and/or testing may be performed in attic space 702 using (e.g., and/or by referring to) attic framing 705, one or more gable vents 710, insulation 715, training assembly 720, knee wall assembly 725, plumbing chase 730, vent 735, top plate assembly 740, knob and tube wiring 745, insulation baffles 750, soffit vents 755, junction box 760, plumbing stack 765, vent duct 770, and/or supply plenum assembly 775.

At step 820, it may be determined (e.g., by users such as operators of mobile training/testing system 100) whether or not use of mobile training/testing system 100 is to be continued at the location (e.g., current geographic location such as geographic locations A or B). If use of mobile training/testing system 100 is to be continued at that geographic location, process 800 may return to step 815. As many iterations as desired of steps 815 and 820 may be repeated. If use of mobile training/testing system 100 is not to be continued at that location (e.g., current geographic location), process 800 proceeds to step 825.

At step 825, it may be determined (e.g., by users such as operators of mobile training/testing system 100) whether or not to use mobile training/testing system 100 at a new geographic location (e.g., move to a new training/testing geographic location). If mobile training/testing system 100 is to be used at a new geographic location, process 800 may return to step 810 and mobile training/testing unit 105 may be moved to the new location for further building training and/or testing similarly to as described above. As many iterations as desired of steps 810 through 825 may be repeated. If use of mobile training/testing system 100 is not to be continued at a new geographic location, process 800 ends at step 830.

The invention includes other illustrative embodiments ("Embodiments") as follows.

Embodiment 1: A vehicle configured to move from a first geographic location to a second geographic location for at least one of building training or testing at each of the first and second geographic locations, comprising: a plurality of rooms including an attic; an attic space disposed in the attic; attic framing disposed in the attic, the attic framing separating the attic space from an empty space; and at least one structural assembly disposed in the attic space and that simulates an attic error to be found during the at least one of building training or testing; wherein the attic framing is disposed at an angle.

Embodiment 2: The vehicle of Embodiment 1, further comprising an attic door separating the attic space from a rest of the plurality of rooms, wherein the attic space is a simulated attic disposed at a same height relative to the vehicle as the rest of the plurality of rooms.

Embodiment 3: The vehicle of Embodiment 1, wherein the empty space is disposed between the attic framing and an exterior wall of the vehicle.

Embodiment 4: The vehicle of Embodiment 1, wherein the at least one structural assembly is at least one selected from the group of a knee wall assembly, a plumbing chase, a top plate assembly, knob and tube wiring, a junction box, a plumbing stack, a vent duct, and combinations thereof.

Embodiment 5: The vehicle of Embodiment 1, further comprising a framing assembly attached to an exterior door frame of the vehicle, the framing assembly strengthening the exterior door frame.

Embodiment 6: The vehicle of Embodiment 5, further comprising a blower door assembly configured to be removably attachable to the framing assembly, the blower door assembly including a fan configured to perform a blower door test on the plurality of rooms.

Embodiment 7: The vehicle of Embodiment 1, wherein the vehicle is an RV or an enclosed mobile trailer.

Embodiment 8: The vehicle of Embodiment 1, wherein: the plurality of rooms includes a CAZ (combustion appliance zone) room; a CAZ door separates the CAZ room from a rest of the plurality of rooms; and wherein at least one working combustion appliance, which is vented by a duct to an outside of the vehicle, is disposed in the CAZ room.

Embodiment 9: The vehicle of Embodiment 1, further comprising a fossil fuel burning furnace disposed in another of the plurality of rooms other than the attic; wherein the fossil fuel burning furnace is vented up and outside of the vehicle by a furnace duct.

Embodiment 10: The vehicle of Embodiment 1, further comprising a gas storage tank water heater disposed in another of the plurality of rooms other than the attic; wherein the gas storage tank water heater is vented via natural draft venting up and outside of the vehicle by a water heater duct.

Embodiment 11: The vehicle of Embodiment 1, wherein: the plurality of rooms includes a CAZ (combustion appliance zone) room; a CAZ door separates the CAZ room from a rest of the plurality of rooms; and wherein a gas clothes dryer, which is vented by a dryer duct to an outside of the vehicle, is disposed in the CAZ room.

Embodiment 12: A method, comprising: moving a vehicle from a first geographic location to a second geographic location, the vehicle having a plurality of rooms including an attic and a CAZ (combustion appliance zone) room; performing at least one of building training or testing including using at least one structural assembly disposed in the attic and that simulates an attic error to be found during the at least one of building training or testing; performing the at least one of building training or testing including using at least one working combustion appliance that is disposed in the CAZ room and that is vented by a duct to an outside of the vehicle; and performing the at least one of building training or testing at each of the first and second geographic locations; wherein the attic is disposed at a same height relative to the vehicle as the CAZ room.

Embodiment 13: The method of Embodiment 12, further comprising: removably attaching a blower door assembly including a fan to a strengthening assembly attached to an exterior door frame of the vehicle; pressurizing interior air in an interior of the vehicle using the fan; and performing a blower door test on the plurality of rooms at each of the first and second geographic locations based on pressurizing the interior air using the fan.

Embodiment 14: The method of Embodiment 12, wherein simulating the attic error includes removably attaching a vent duct in the attic to an attic fan at least partially disposed in the attic, the attic error created by disconnecting the vent duct, which is vented to outside of the vehicle, from the attic fan at each of the first and second geographic locations.

Embodiment 15: The method of Embodiment 12, further comprising checking a working bathroom exhaust fan, which is disposed in another of the plurality of rooms than the attic and the CAZ room, for CFM (cubic feet per minute) fan flow at each of the first and second geographic locations.

Embodiment 16: The method of Embodiment 12, performing combustion science testing on a working gas range, which is disposed in another room of the plurality of rooms than the attic and the CAZ room, at each of the first and second geographic locations; and performing CFM (cubic feet per minute) fan flow testing of a working range hood of the gas range at each of the first and second geographic locations.

Embodiment 17: A vehicle configured to move from a first geographic location to a second geographic location for at least one of building training or testing at each of the first and second geographic locations, comprising: a plurality of rooms including an attic and a CAZ (combustion appliance zone) room; an attic space disposed in the attic; attic framing disposed in the attic, the attic framing separating the attic space from an empty space formed between the attic framing and an exterior wall of the vehicle; and at least one working combustion appliance disposed in the CAZ room and vented by a duct to an outside of the vehicle; wherein the attic is disposed at a same height relative to the vehicle as the CAZ room and a rest of the plurality of rooms; and wherein the attic framing is disposed at an angle.

Embodiment 18: The vehicle of Embodiment 17, wherein the attic framing is configured as an attic gable separating the attic space from the empty space, the attic framing disposed within the vehicle and covered by the exterior wall of the vehicle.

Embodiment 19: The vehicle of Embodiment 17, wherein the plurality of rooms further includes a kitchen, the kitchen including at least one working gas range including a working range hood, and a working refrigerator including a manufacturer data plate disposed in an interior of the refrigerator.

Embodiment 20: The vehicle of Embodiment 17, further comprising an HVAC supply chase disposed in another of the plurality of rooms other than the attic and the CAZ room; wherein the HVAC supply chase includes a transparent wall through which portions of ductwork are visible.

In at least some exemplary embodiments, the exemplary disclosed system, apparatus, and method may provide an efficient and effective system for providing training and/or testing involving building weatherization and building science. The exemplary disclosed system, apparatus, and method may provide a mobile training and testing unit that may make attending training convenient for personnel to be trained. The exemplary disclosed system, apparatus, and method may provide for moving a mobile unit, which may include some, most, or substantially all building features and mechanical systems for providing building weatherization and building science, to a convenient geographic location that may be easy for personnel to be trained to reach. For example, the exemplary disclosed system, apparatus, and method may involve moving a mobile training and testing unit having some, most, or substantially all building features and mechanical systems to a convenient geographic location for personnel to be trained and/or tested.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. A vehicle configured to move from a first geographic location to a second geographic location for at least one of building training or testing at each of the first and second geographic locations, comprising:
    a plurality of rooms including an attic;
    an attic space disposed in the attic;
    attic framing disposed in the attic, the attic framing separating the attic space from an empty space; and
    at least one structural assembly disposed in the attic space and that simulates an attic error to be found during the at least one of building training or testing;
    wherein the attic framing is disposed at an angle.

2. The vehicle of claim 1, further comprising an attic door separating the attic space from a rest of the plurality of rooms, wherein the attic space is a simulated attic disposed at a same height relative to the vehicle as the rest of the plurality of rooms.

3. The vehicle of claim 1, wherein the empty space is disposed between the attic framing and an exterior wall of the vehicle.

4. The vehicle of claim 1, wherein the at least one structural assembly is at least one selected from the group of a knee wall assembly, a plumbing chase, a top plate assembly, knob and tube wiring, a junction box, a plumbing stack, a vent duct, and combinations thereof.

5. The vehicle of claim 1, further comprising a framing assembly attached to an exterior door frame of the vehicle, the framing assembly strengthening the exterior door frame.

6. The vehicle of claim 5, further comprising a blower door assembly configured to be removably attachable to the framing assembly, the blower door assembly including a fan configured to perform a blower door test on the plurality of rooms.

7. The vehicle of claim 1, wherein the vehicle is an RV or an enclosed mobile trailer.

8. The vehicle of claim 1, wherein:
    the plurality of rooms includes a CAZ (combustion appliance zone) room;
    a CAZ door separates the CAZ room from a rest of the plurality of rooms; and
    wherein at least one working combustion appliance, which is vented by a duct to an outside of the vehicle, is disposed in the CAZ room.

9. The vehicle of claim 1, further comprising a fossil fuel burning furnace disposed in another of the plurality of rooms other than the attic;
    wherein the fossil fuel burning furnace is vented up and outside of the vehicle by a furnace duct.

10. The vehicle of claim 1, further comprising a gas storage tank water heater disposed in another of the plurality of rooms other than the attic;
    wherein the gas storage tank water heater is vented via natural draft venting up and outside of the vehicle by a water heater duct.

11. The vehicle of claim 1, wherein:
    the plurality of rooms includes a CAZ (combustion appliance zone) room;
    a CAZ door separates the CAZ room from a rest of the plurality of rooms; and
    wherein a gas clothes dryer, which is vented by a dryer duct to an outside of the vehicle, is disposed in the CAZ room.

12. A vehicle configured to move from a first geographic location to a second geographic location for at least one of building training or testing at each of the first and second geographic locations, comprising:
    a plurality of rooms including an attic and a CAZ (combustion appliance zone) room;
    an attic space disposed in the attic;
    attic framing disposed in the attic, the attic framing separating the attic space from an empty space formed between the attic framing and an exterior wall of the vehicle; and
    at least one working combustion appliance disposed in the CAZ room and vented by a duct to an outside of the vehicle;
    wherein the attic is disposed at a same height relative to the vehicle as the CAZ room and a rest of the plurality of rooms; and
    wherein the attic framing is disposed at an angle.

13. The vehicle of claim 12, wherein the attic framing is configured as an attic gable separating the attic space from the empty space, the attic framing disposed within the vehicle and covered by the exterior wall of the vehicle.

14. The vehicle of claim 12, wherein the plurality of rooms further includes a kitchen, the kitchen including at least one working gas range including a working range hood, and a working refrigerator including a manufacturer data plate disposed in an interior of the refrigerator.

15. The vehicle of claim 12, further comprising an HVAC supply chase disposed in another of the plurality of rooms other than the attic and the CAZ room;

wherein the HVAC supply chase includes a transparent wall through which portions of ductwork are visible.

* * * * *